United States Patent [19]

Flache

[11] Patent Number: 5,901,899
[45] Date of Patent: May 11, 1999

[54] WAVE SOLDERING MACHINE AND METHOD OF ADJUSTING AND AUTOMATICALLY CONTROLLING THE HEIGHT OF A SOLDER WAVE

[75] Inventor: Norbert Flache, Essen, Germany

[73] Assignee: U.S. Philips Corporation, NY, N.Y.

[21] Appl. No.: 08/718,808

[22] Filed: Sep. 24, 1996

[30] Foreign Application Priority Data

Sep. 26, 1995 [DE] Germany ............................. 195 35 688

[51] Int. Cl.⁶ ............................... H05K 3/34; B23K 3/06
[52] U.S. Cl. .................................... 228/37; 228/8; 118/429
[58] Field of Search .................................. 228/8, 37, 102, 228/260; 156/356, 578; 427/96, 123; 118/410, 429; 210/101; 73/195, 199, 861

[56] References Cited

U.S. PATENT DOCUMENTS

| | | | |
|---|---|---|---|
| 3,726,465 | 4/1973 | Boynton et al. | 228/37 |
| 4,773,583 | 9/1988 | Ishii et al. | 228/37 |
| 4,890,781 | 1/1990 | Johnson et al. | 228/7 |
| 5,467,914 | 11/1995 | Peterson et al. | 228/102 |
| 5,615,828 | 4/1997 | Stoops | 427/96 |

FOREIGN PATENT DOCUMENTS

| | | |
|---|---|---|
| 2682903 | 4/1993 | France . |
| 95-12902 | 4/1995 | Germany . |
| 4418732A1 | 11/1995 | Germany . |

OTHER PUBLICATIONS

"Fundamentals of Fluid Mechanics", Philips M. Gerhart, Richard J. Gross, Addison–Wesley Publishing Co.

Primary Examiner—Samuel M. Heinrich
Attorney, Agent, or Firm—Steven R. Biren

[57] ABSTRACT

The invention relates to a wave soldering machine with at least one device for generating at least one solder wave (10a) consisting of liquid solder (10) for wetting assembled units (22) which are conducted over the solder wave (10a). To achieve a reproducible adjustment and control of the wave height (24), it is proposed to mount at least one temperature-compensated pressure sensor (18) in the transport path of the solder (10), preferably in the immediate vicinity of the nozzle opening (13).

4 Claims, 1 Drawing Sheet

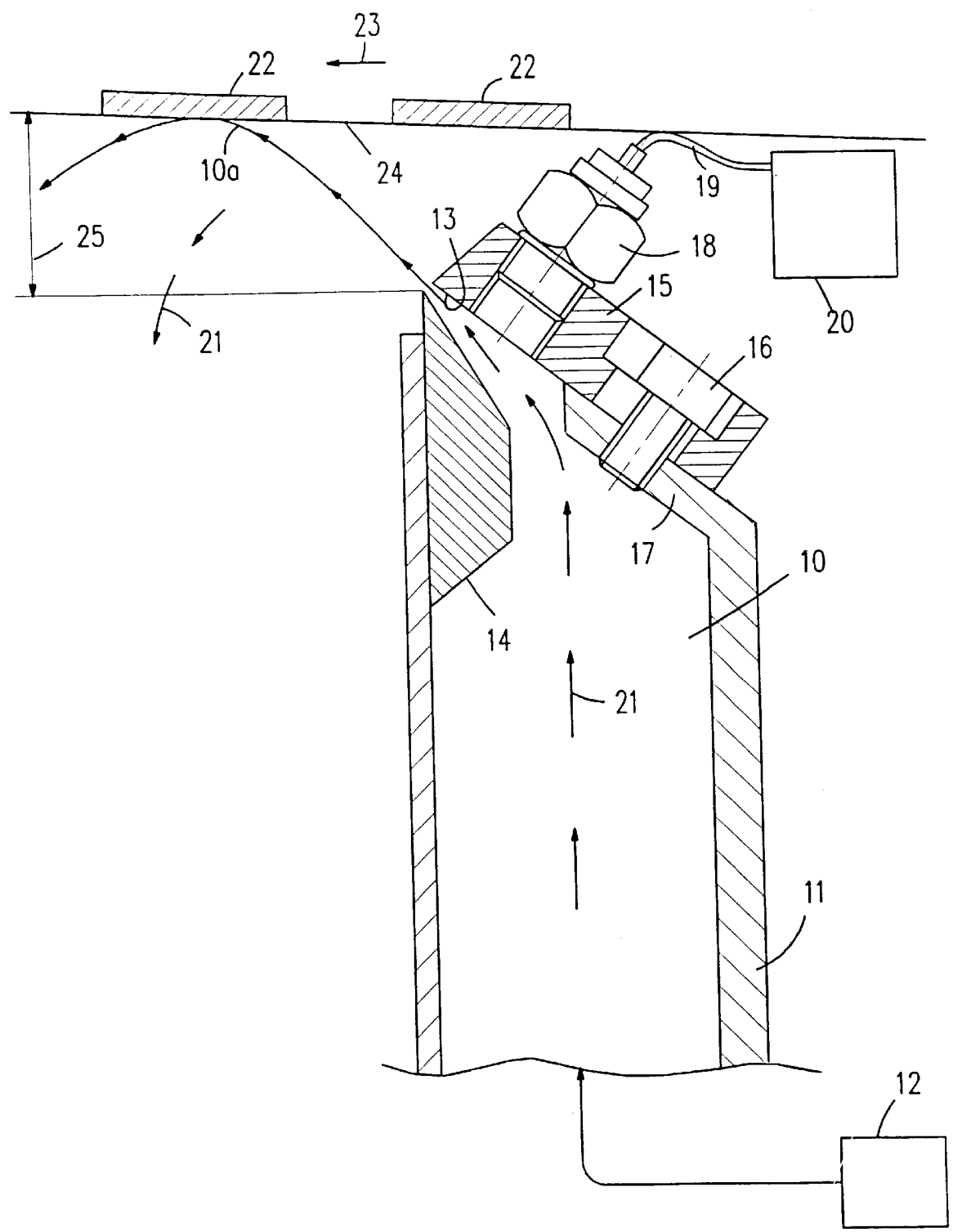

WAVE SOLDERING MACHINE AND METHOD OF ADJUSTING AND AUTOMATICALLY CONTROLLING THE HEIGHT OF A SOLDER WAVE

The invention relates to a wave soldering machine with at least one device for generating at least one wave consisting of liquid solder for soldering assembled units which are transported over the solder wave. The invention further relates to a method of adjusting and automatically controlling the height of the solder wave consisting of liquid solder of a soldering machine.

A wave soldering machine of the kind mentioned above is known from, for example, DE-A-95 12 902. This soldering apparatus comprises so-called solder waves arranged transversely to a transport direction, which waves consist of liquid solder and wet the assembled units to be soldered from below. The liquid solder is here transported by a pump from a bath into an ejection opening (solder nozzle), so that solder emerges in the form of a film and assumes the shape of a solder wave. The height of the solder wave in apparatuses or machines of this kind must be adjusted such that an optimum wetting of the assembled units passed over them is achieved. A requirement for this is that the solder wave should not be too low, since in that case no solder would wet the assemblies. On the other hand, the solder wave should not be too high, since in that case short-circuit bridges are formed on the assemblies and solder would penetrate, for example, through bores in the assemblies. This leads to the requirement that the level of the solder wave must be exactly set such that the above requirements are complied with. In the known construction, the height adjustment is effected by means of experiments, and after the optimum height has been achieved, the accompanying boundary conditions are then laid down. This means that on the one hand the opening in the solder nozzle through which the solder is transported upwards and on the other hand the quantity of solder transported per unit time are laid down for a given process. If some boundary conditions then change, requiring a change in the height of the solder wave, the optimum height of the solder wave is to be ascertained anew by means of experiments, so that subsequently the accompanying parameters, such as nozzle width and transport rate, may be set once more.

A computer-controlled soldering machine is known from U.S. Pat. No. 4,890,781. The height of the solder wave relative to the assembled units to be soldered therein is monitored by means of a sensor here. This sensor is a proximity detector mounted above the solder wave.

The invention has for its object to simplify the adjustment of the solder wave height and to keep this height constant during operation.

According to the invention, this object is achieved in a wave soldering machine of the kind mentioned in the opening paragraph in that at least one sensor measuring the flow rate is arranged in the transport path of the solder before it emerges from an ejection opening, which sensor is connected to a data comparison unit.

This yields the advantage that the height of any required solder wave can be quickly and readily adjusted in an uncomplicated way and that it can be adapted to any current requirement, as applicable, also during a soldering process. The soldering results can be improved thereby, because a laborious adaptation to the new values by means of experiments, as before, becomes redundant. Such a sensor is not prone to defects and supplies reliable data.

The measured values supplied by this sensor are then compared with a required value in accordance with the method described below, and depending on this comparison, an adaptation of the solder quantity supplied for forming the solder wave is then adapted, if necessary.

In an embodiment of the invention, the sensor is a temperature-compensated pressure sensor. The correct setting of the solder wave height then takes place in dependence on the pressure of the supplied solder as measured by the pressure sensor. The measured data are independent of the temperature then. This leads to a simple possibility of adjusting and controlling the wave height in a reproducible manner.

According to an embodiment of the invention applied to a wave soldering machine having a nozzle head with a narrow opening for forming the solder wave, the pressure sensor is preferably arranged in the immediate vicinity of the narrow ejection opening. A sufficient pressure prevails in this region, so that an unequivocal relation between the measured pressure, transported solder quantity, and wave height is given. The chosen arrangement eliminates the influences on the flow of the solder (the tin) between the pump unit and the ejection opening, since the measuring point is positioned in the immediate vicinity of the solder outlet. The incorporation position of the sensor is so chosen that it is avoided that it affects the shape of the solder wave.

A method of adjusting the height of the solder wave is characterized in that a quantity proportional to the flow rate of the solder forming the solder wave is measured by the sensor, which quantity is proportional to the wave height, the measured value is compared with a required value corresponding to a desired height of the solder wave, and in the case of a deviation from the required value, the quantity of solder supplied by a pump is increased or decreased through a change in the pump speed.

Said quantity may be, for example, the pressure.

The comparison of the measured values of the sensor and the evaluation thereof takes place in a data comparison and evaluation unit.

In the drawing, the sole FIGURE represents an embodiment of a nozzle head of a wave soldering machine, depicted diagrammatically, a transport belt with assembled units to be soldered being arranged above the nozzle head.

The FIGURE shows the nozzle head 11 filled with solder 10 from which solder is transported in upward direction towards a narrow opening 13 by a pump 12. The narrow opening 13 in this example is formed by a knife-edge strip 14 in a fixed position and an adjust knife-edge strip 15 which is fastened with screws 16 on a flange 17 of the nozzle head 11. A pressure sensor 18 is arranged in the vicinity of the narrow opening 13 and is connected to an evaluation and comparison unit 20 via a line 19. The pressure sensor 18 should be mounted as close as possible to the narrow opening 13 because that is where the pressure to be measured for the soldering process obtains. The solder 10 transported by the pump 12 is transported in the direction of arrow 21 upwards towards the narrow opening 13 and from there urged against the lower sides of assembled units 22, in order to connect relevant contact parts with one another by means of solder there. The assembled units 22 are transported on a belt 24 in the direction of arrow 23. The solder 10 issuing from the narrow opening 13 forms a so-called solder wave 10a.

To achieve that the solder 10 issuing from the narrow opening 13 has the correct transport height 25, the pressure sensor 18 measures the pressure of the transported solder 10. When the pressure is too low, the solder will follow a path indicated with 21', so that no adequate wetting of the assembled units can take place. When the pressure is too high, the solder 10 will be pressed through openings of the assembled units. To obtain the correct transport height 25, the pressure measured by the sensor 18 is compared with a required value in the comparison unit 20 and can thus be exactly adjusted. The sensor 18 for this purpose measures a quantity which is proportional to the flow rate, and therefore to the wave height 25. This quantity is the pressure inside the nozzle 13.

A control quantity for controlling the pump speed is supplied from the comparison unit 20. The speed of the pump 12 is then adapted in accordance with these data (closed-loop control circuit).

The quantity to be adjusted to achieve the wave height 24 is the pump speed, the measured quantity for the wave height 24 is the pressure measured by sensor 18. The interrelation is achieved by a suitable logic in the comparison unit.

Medium-speed and slow changes in the wave height 24 are to be corrected only. A corresponding control behaviour is to be given to the comparison unit 20 for this. The relevant control parameters must be individually ascertained for each machine type.

The wave heights are specific for a product and must be ascertained experimentally. Once the wave heights have been ascertained, they may be programmed as required values.

I claim:

1. A wave soldering machine with at least one device for generating at least one wave (10a) consisting of liquid solder (10) for soldering assembled units (22) which are transported over the solder wave (10a), characterized in that at least one sensor (18) measuring the flow rate is arranged in the transport path of the solder (10) before it emerges from an ejection opening (13), which sensor (18) is connected to a data comparison unit (20).

2. A wave soldering machine as claimed in claim 1, characterized in that the sensor (18) is a temperature-compensated pressure sensor.

3. A wave soldering machine as claimed in claim 1, with a nozzle head comprising a narrow opening (13) for forming the solder wave (10a), characterized in that the pressure sensor (18) is arranged as close as possible to the narrow opening (13) of the nozzle.

4. A wave soldering machine as claimed in claim 2, with a nozzle head comprising a narrow opening (13) for forming the solder wave (10a), characterized in that the pressure sensor (18) is arranged as close as possible to the narrow opening (13) of the nozzle.

* * * * *